(12) United States Patent
Maki et al.

(10) Patent No.: US 11,314,271 B2
(45) Date of Patent: Apr. 26, 2022

(54) SEMICONDUCTOR APPARATUS FOR POWER SUPPLY CONTROL AND OUTPUT VOLTAGE VARIABLE POWER SUPPLY APPARATUS

(71) Applicants: Shinichiro Maki, Hiratsuka (JP);
Yoichi Takano, Hadano (JP);
Katsuhiro Yokoyama, Atsugi (JP)

(72) Inventors: Shinichiro Maki, Hiratsuka (JP);
Yoichi Takano, Hadano (JP);
Katsuhiro Yokoyama, Atsugi (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 30 days.

(21) Appl. No.: 17/061,281

(22) Filed: Oct. 1, 2020

(65) Prior Publication Data
US 2021/0018946 A1 Jan. 21, 2021

Related U.S. Application Data

(62) Division of application No. 16/352,765, filed on Mar. 13, 2019, now Pat. No. 10,831,222.

(30) Foreign Application Priority Data

Apr. 3, 2018 (JP) .............................. JP2018-071817
Dec. 28, 2018 (JP) .............................. JP2018-247303

(51) Int. Cl.
*H02M 3/158* (2006.01)
*G05F 1/59* (2006.01)
*H02P 7/285* (2016.01)

(52) U.S. Cl.
CPC ................. *G05F 1/59* (2013.01); *H02P 7/285* (2013.01)

(58) Field of Classification Search
CPC .......... G05F 1/59; G05F 1/5735; H02P 7/285; H02M 3/158
See application file for complete search history.

(56) References Cited

U.S. PATENT DOCUMENTS

| 8,665,020 B2 | 3/2014 | Sakurai et al. |
| 8,786,317 B2 | 7/2014 | Terada et al. |

(Continued)

FOREIGN PATENT DOCUMENTS

| JP | H11265224 A | 9/1999 |
| JP | 2010055490 A | 3/2010 |

OTHER PUBLICATIONS

Related U.S. Appl. No. 17/061,370; First Named Inventor: Shinichiro Maki; Title: "Semiconductor Apparatus for Power Supply Control and Output Voltage Variable Power Supply Apparatus", filed Oct. 1, 2020.

(Continued)

*Primary Examiner* — Cortez M Cook
(74) *Attorney, Agent, or Firm* — Holtz, Holtz & Volek PC

(57) ABSTRACT

A power supply control apparatus includes a voltage control transistor connected between a DC voltage input terminal and an output terminal; a control circuit which controls the voltage control transistor according to an output feedback voltage; and a first external terminal receiving an output control signal to control an output voltage. The control circuit includes a first error amplifier outputting a voltage according to an electric potential difference between a voltage divided by a first voltage dividing circuit which divides the output voltage of the output terminal and a predetermined reference voltage; and an output changing circuit including a second error amplifier receiving a voltage input in the first external terminal, a transistor having a control terminal receiving the output of the second error amplifier, and a current mirror circuit connected to the (Continued)

voltage input terminal which transfers an electric current flowing in the transistor. The current mirror circuit is connected to a node from which the divided voltage is taken out, and the output changing circuit displaces the divided voltage according to a voltage input in the first external terminal to change the output voltage according to the output control signal.

13 Claims, 5 Drawing Sheets

(56) References Cited

U.S. PATENT DOCUMENTS

| | | | |
|---|---|---|---|
| 8,847,569 | B2 | 9/2014 | Terada et al. |
| 9,606,556 | B2 | 3/2017 | Takano et al. |
| 9,952,610 | B1 | 4/2018 | Yokoyama et al. |
| 9,996,093 | B2 | 6/2018 | Takano et al. |
| 10,063,135 | B2 | 8/2018 | Maki et al. |
| 10,296,034 | B2 | 5/2019 | Sakurai et al. |
| 10,466,728 | B2 | 11/2019 | Maki et al. |
| 2012/0098513 | A1* | 4/2012 | Terada ................ G05F 1/5735 323/284 |
| 2012/0187930 | A1 | 7/2012 | Williams et al. |
| 2017/0063232 | A1* | 3/2017 | Takano ................ H02M 3/158 |

OTHER PUBLICATIONS

Notice of Allowance dated Feb. 2, 2022, issued in related U.S. Appl. No. 17/061,370.

* cited by examiner

SEMICONDUCTOR APPARATUS FOR POWER SUPPLY CONTROL AND OUTPUT VOLTAGE VARIABLE POWER SUPPLY APPARATUS

CROSS-REFERENCE TO RELATED APPLICATION

This application is a Divisional application of U.S. application Ser. No. 16/352,765, filed on Mar. 13, 2019, which is based upon and claims the benefit of priority from the prior Japanese Patent Application No. 2018-071817, filed Apr. 3, 2018 and Japanese Application No. 2018-247303, filed Dec. 28, 2018, the entire contents all of which are incorporated herein by reference.

BACKGROUND OF THE INVENTION

Field of the Invention

The present invention relates to a DC power supply apparatus and relates to a useful technique used in a semiconductor apparatus for power supply control which is a series regulator type in which output voltage can be changed linearly and an output voltage variable power supply apparatus.

DESCRIPTION OF THE RELATED ART

There is a series regulator (hereinafter referred to as a regulator) which is used as a power supply apparatus in which a transistor provided between a DC voltage input terminal and output terminal is controlled to output a DC voltage in a predetermined potential. The purpose of use for such regulator may be a constant voltage power supply apparatus (car mounted regulator) to supply DC current to an electronic device provided in a vehicle, for example, a ventilating device (fan), an illuminating device or an audio device mounted on a body of an automobile.

In an electronic device such as a ventilating device (fan) or an illuminating device, there may be a demand to provide a function in which the voltage which drives a motor rotating the fan or which drives a lamp of the illuminating device is changed linearly to be able to continuously change the amount of ventilation or the brightness of the illumination. Therefore, there is a demand that the regulator includes a function in which the output voltage can be changed linearly.

Conventional inventions showing regulators in which the output voltage can be changed is described in Japanese Patent Application Laid-Open Publication No. H11-265224 and Japanese Patent Application Laid-Open Publication No. 2010-055490, for example.

According to the regulator described in Japanese Patent Application Laid-Open Publication No. H11-265224, a plurality of resistors connected in series as a voltage dividing circuit which divides the output voltage to generate the feedback signal, and a switch transistor connected parallel with these resistors are provided, and any of the switch transistors may be conducted by voltage setting input to change the voltage dividing ratio. With this, the output voltage is changed.

The output voltage can be switched in stages in the regulator according to the above invention but the output voltage cannot be changed linearly. The number of resistors in series included in the voltage dividing circuit and the number of switch transistors may be increased to approximately change the output voltage linearly. However, according to the above, the number of elements increases and the square area necessary for mounting the elements increases. Therefore, it becomes difficult to make the apparatus smaller.

Japanese Patent Application Laid-Open Publication No. 2010-055490 describes a variable output voltage regulator in which the output voltage is adjusted by including a voltage controller including a voltage monitoring circuit which monitors adjustment resistor elements and output voltage provided between both terminals of one resistor in series included in an output voltage dividing circuit to generate feedback voltage to a linear regulator.

However, the regulator according to the above invention configures an adjustment circuit of the output voltage value with an externally attached element of the regulator IC. The number of components included in the apparatus increases, and the square area necessary to mount the components becomes large. Consequently, it becomes difficult to make the apparatus smaller and the consumed electric power increases. Moreover, the amount of power consumed becomes large. Further, the output voltage is varied due to the variation in the resistance value of the adjustment resistor elements being used. Therefore, the accuracy of the output voltage decreases.

SUMMARY OF THE INVENTION

The present invention is conceived in view of the above problems, and the object of the present invention is to provide a semiconductor apparatus for power supply control and an output voltage variable power supply apparatus with which the output voltage can be changed linearly without increasing the number of elements and components.

Another object of the present invention is to provide a semiconductor apparatus for power supply control and an output voltage variable power supply apparatus with a high output voltage accuracy.

Another object of the present invention is to provide a semiconductor apparatus for power supply control and an output voltage variable power supply apparatus which are able to easily control output voltage using a general purpose microcomputer.

According to one aspect of the present invention, a semiconductor apparatus for power supply control includes: a voltage control transistor connected between a voltage input terminal in which DC voltage is input and an output terminal; a control circuit which controls the voltage control transistor according to an output feedback voltage; and a first external terminal in which an output control signal supplied from outside to control output voltage is input, wherein, the control circuit further includes: a first error amplifier which outputs a voltage according to an electric potential difference between a voltage divided by a first voltage dividing circuit which divides the output voltage of the output terminal and a predetermined reference voltage; and an output changing circuit which displaces the reference voltage input in the first error amplifier or the voltage divided by the first voltage dividing circuit according to a voltage input in the first external terminal to change the output voltage to a voltage according to the output control signal.

Preferably, in the semiconductor apparatus for power supply control, the output voltage changing circuit includes, a second voltage dividing circuit which divides the voltage input in the first external terminal, a first transistor and a first resistor element connected in series between anode from which the voltage divided by the first voltage dividing circuit is taken out and a constant potential point, and a second error amplifier which outputs voltage according to an electric potential difference between the voltage divided by the second voltage dividing circuit and the voltage converted by current-voltage conversion by the first resistor element, wherein, the output of the second error amplifier is applied to a control terminal of the first transistor.

Preferably, in the semiconductor apparatus for power supply control, the output voltage changing circuit includes, a third voltage dividing circuit which divides the reference voltage, a second transistor and a second resistor element connected in series between a node from which voltage divided by the third voltage dividing circuit is taken out and a constant potential point, and a third error amplifier which outputs voltage according to an electric potential difference between a voltage input in the first external terminal and the voltage converted by current-voltage conversion by the second resistor element, wherein the output of the third error amplifier is applied to the control terminal of the second transistor.

Preferably, in the semiconductor apparatus for power supply control, the output voltage changing circuit includes, a fourth error amplifier in which voltage input in the first external terminal is input, a third transistor in which output of the second error amplifier is applied to the control terminal, a current mirror circuit which is connected to the voltage input terminal and which transfers an electric current flowing in the third transistor, and a third resistor element connected in series with the third transistor, wherein, the fourth error amplifier outputs voltage according to an electric potential difference between the voltage input in the first external terminal and the voltage converted by current-voltage conversion by the third resistor element to the control terminal of the third transistor, flows an electric current according to the electric potential difference in the third transistor, and pulls out from or flows in the node from which the voltage divided by the first voltage dividing circuit is taken out the electric current transferred in the current mirror circuit.

Preferably, the semiconductor apparatus for power supply control further includes, a reference voltage source which generates the reference voltage; a bias circuit which generates an operation electric current supplied to the reference voltage source and the first error amplifier; and a second external terminal in which a control signal supplied from outside is input to stop an operation of the power supply apparatus, wherein the bias circuit stops the supply of the operation electric current to the reference voltage source and the first error amplifier according to the control signal input in the second external terminal.

According to another aspect of the present invention, an output voltage variable power supply apparatus includes: the semiconductor apparatus for power supply control; and a control apparatus which outputs a signal input to the first external terminal or the first external terminal and the second external terminal, wherein, the output voltage changes according to the signal input from the control apparatus to the first external terminal.

Preferably, in the output voltage variable power supply apparatus, a load connected to the output terminal of the semiconductor apparatus for power supply control is a DC motor.

BRIEF DESCRIPTION OF THE DRAWINGS

The present invention will be described through the detailed description below and the accompanying drawings. Such description and drawings should not be construed to limit the present invention.

DESCRIPTION OF THE PREFERRED EMBODIMENTS

A preferable embodiment of the present invention is described with reference to the drawings.

First Embodiment

Figure 1:
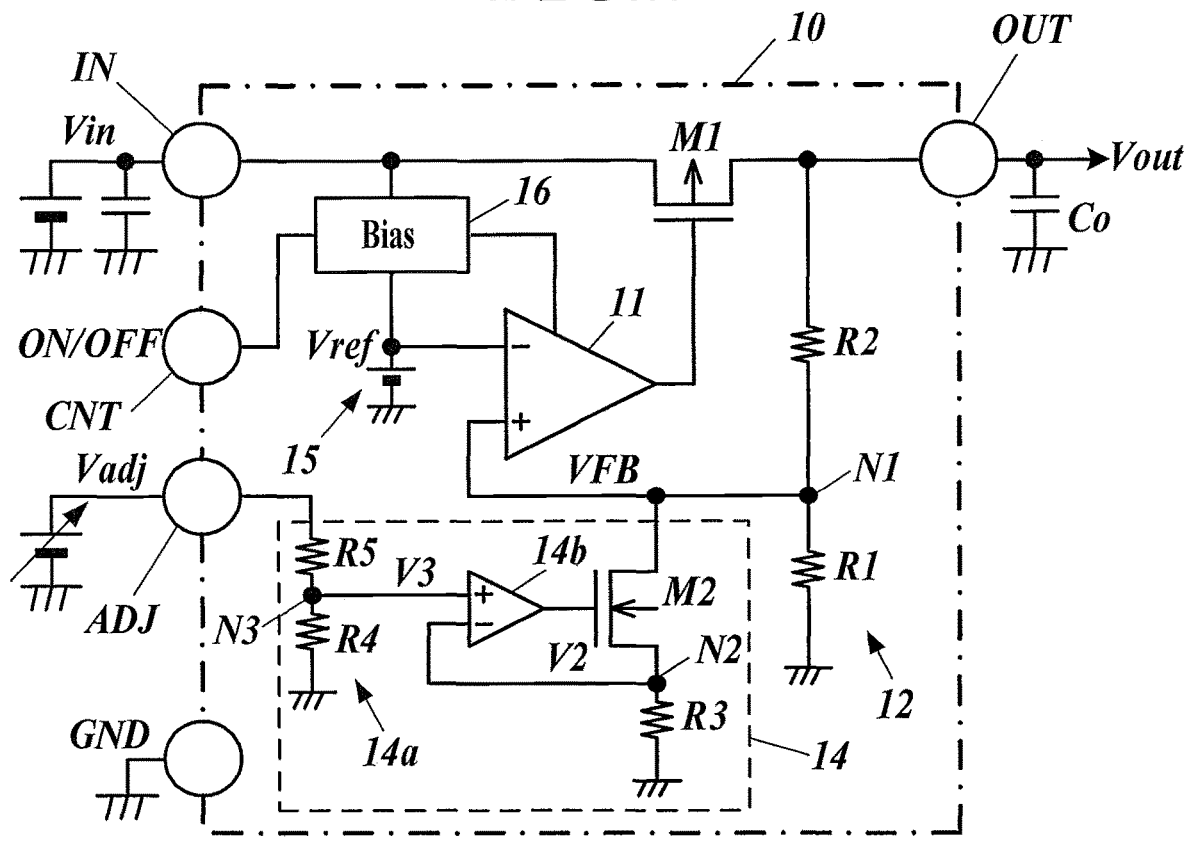
FIG. 1 is a diagram of a circuit configuration showing a first embodiment of a series regulator type output voltage variable power supply apparatus applying the present invention.

FIG. 1 shows a first embodiment of a series regulator as an output voltage variable power supply apparatus applying the present invention. In FIG. 1, the portion surrounded by a short and long dash line is formed as a semiconductor integrated circuit (regulator IC) 10 on a semiconductor chip such as single crystal silicon. The above functions as an output voltage variable power supply apparatus which outputs a stable DC voltage to a load such as a motor or LED lamp (not shown) by connecting a condenser Co to an output terminal OUT of the regulator IC 10.

As shown in FIG. 1, according to the output voltage variable power supply apparatus of the present embodiment, P-channel MOS transistor M1 to control the voltage (insulated gate electric field effect transistor) is connected between a voltage input terminal IN and an output terminal OUT on which input DC voltage Vin of the regulator IC 10 is applied. Resistors R2 and R1 composing a pressure dividing circuit 12 which divides output voltage Vout are connected in series between the output terminal OUT and a ground line on which ground potential GND is applied.

The voltage of the connection node N1 between the resistors R1 and R2 composing the voltage dividing circuit 12 is input as feedback voltage VFB in a non-inverting input terminal of an error amplifier 11 as an error amplifying circuit which controls a gate terminal of the transistor M1 for controlling the voltage. Then, the error amplifier 11 generates the voltage according to the potential difference between output feedback voltage VFB and predetermined reference voltage Vref, supplies the voltage to the gate terminal of the transistor M1 for controlling the voltage and controls M1 so that the output voltage Vout is a desired electric potential.

In the regulator IC 10 according to the present embodiment, an N-channel MOS transistor M2 and a resistor R3 are connected in series between the connection node N1 of the resistors R1 and R2 and a grounding point. In the regulator IC 10, the output control terminal ADJ is provided as the external terminal in which the signal Vadj which controls the output voltage Vout supplied from the microcomputer (not shown) is input. Between the terminal ADJ and the grounding point, resistors R4 and R5 composing a voltage dividing circuit 14a which divides the output control signal Vadj are connected in series.

An error amplifier 14b is provided as an error amplifying circuit in which voltage V3 (voltage of node N3) divided by the voltage dividing circuit 14a is to be input and which controls the gate terminal of the MOS transistor M2.

There is negative feedback in the error amplifier 14b when the voltage V2 of the connection node N2 between the control target MOS transistor M2 and the resistor R3 is input in the inverting input terminal. With the imaginary short, the transistor M2 is driven so that an electric current flows in the resistor R3 to make the voltage V2 of the node N2 the same as the voltage V3 of the node N3.

Then, the feedback voltage VFB displaced by the above electric current flowing in the resistor R3 is input in the non-inverting input terminal of the error amplifier 11 which controls the gate terminal of the transistor M1 for controlling the voltage. With this, the output voltage Vout according to the output control signal Vadj is output to the output terminal OUT of the regulator IC 10. Therefore, the output voltage changing circuit 14 which changes the voltage of the output voltage Vout according to the output controlling signal Vadj is configured with the voltage dividing circuit 14a, the error amplifier 14b and the transistor M2 and the resistor R3.

The output voltage Vout is represented by the following formula (1).

$$V\text{out}=((R1+R2)/R1)*V\text{ref}+(V2/R3)*R2 \quad (1)$$

The voltage V3 of the node N3 is represented by the following formula (2).

$$V3=(R4/(R4+R5))*V\text{adj} \quad (2)$$

Here, V2=V3, and from the above formulas (1) and (2), Vout is represented by the following formula (3).

$$V\text{out}=((R1+R2)/R1)*V\text{ref}+((R4*R2)/R3*(R4+R5))*V\text{adj} \quad (3)$$

According to the above-described formula (3), the output voltage Vout is determined by a relative accuracy of the internal resistor, and it is possible to set the value accurately. The output control signal Vadj input to the output control terminal ADJ can be set within the output range of the D/A conversion circuit which generates the output control signal Vadj. Since the gain of the output voltage Vout decreases, the variation of the output voltage Vout with relation to the accuracy of the output control signal Vadj becomes smaller. The variation range of the output voltage Vout is Vref to Vin.

Figure 2:
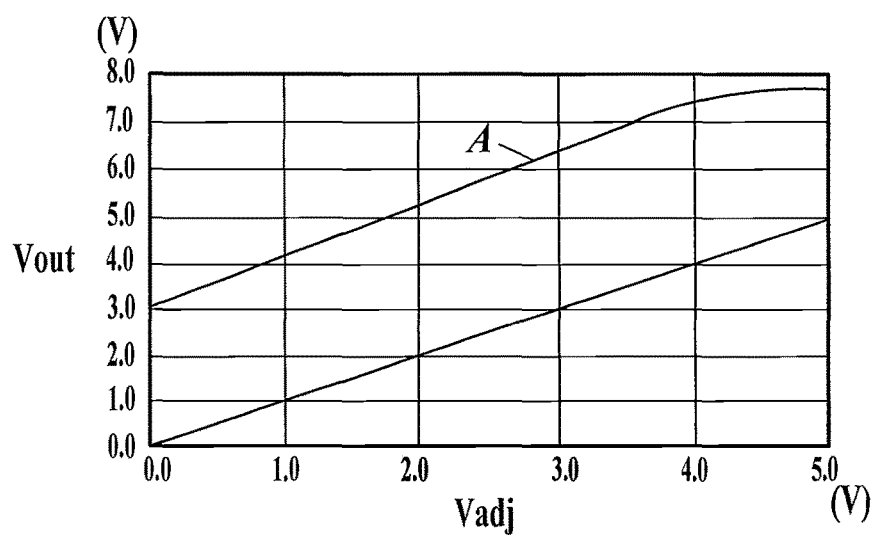
FIG. 2 is a graph showing a relation between an output control signal Vadj and output voltage Vout in a regulator according to the first embodiment.

FIG. 2 shows an example of a relation between the output control signal Vadj and the output voltage Vout in the output voltage variable power supply apparatus according to the present embodiment. It is possible to understand from FIG. 2 that the output voltage Vout is in proportion with the output control signal Vadj, and the tilt of the Vout-Vadj characteristic line A is an almost stable straight line. The tilt can be suitably set by the value of the resistor.

The output voltage Vout when the output control signal Vadj is 0V is "0" from the second term of the above-described formula (3), and therefore, the output voltage Vout is set by the ratio between resistors R1 and R2 and the reference voltage Vref. Specifically, for example, when the reference voltage Vref is 1.5V, if the ratio between R1 and R2 is 1:1, the output voltage Vout at Vadj=0V can be set to 3V. With this, for example, when a power supply apparatus is designed to supply a power supply voltage to a motor which operates with at least a minimum voltage of 3V, the motor can be surely operated and the number of rotations can be increased by enhancing the output control signal Vadj.

The regulator IC 10 according to the present embodiment includes a reference voltage source 15 which generates a reference voltage Vref based on the input voltage Vin, a bias circuit 16 which generates an operation electric current of the error amplifier 11, and an on/off control terminal CNT as an external terminal in which a signal ON/OFF to control on and off of the bias circuit 16 is input. When the on and off control signal ON/OFF of the low level (0V) is input to the on/off control terminal CNT, the bias circuit 16 stops the supply of the operation electric current to the reference voltage source 15 and the error amplifier 11, and the operation of these circuits are stopped.

Figure 3:
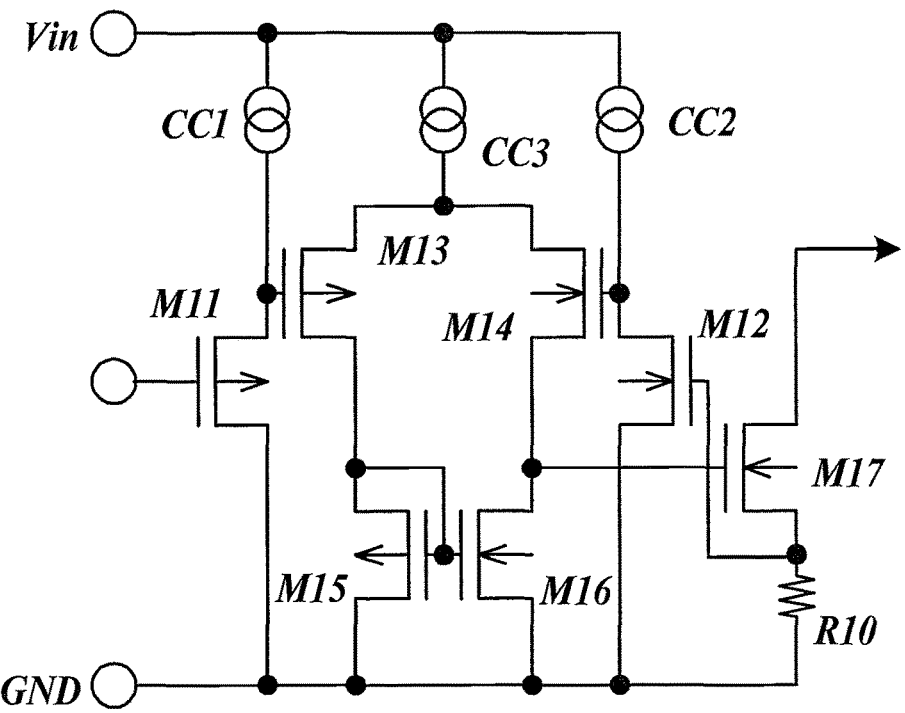
FIG. 3 is a circuit diagram showing an example of an error amplifying circuit composing an output control circuit in a regulator according to the first embodiment.

As the error amplifiers 11 and 14b, a differential amplifying circuit as shown in FIG. 3 can be used. Such differential amplifying circuit includes an input unit including transistors M11 and M12 and constant current sources CC1 and CC2, a differential amplifying unit including differential input transistors M13 and M14, active load transistors M15 and M16, and constant current source CC3, and output unit including a transistor M17 in which a gate terminal is connected to the output node of the differential amplifying unit, and a resistor R10 connected between the source terminal of the transistor M17 and the grounding point. The circuit shown in FIG. 3 is one example, and the circuit configuration is not limited to the above.

Next, an example of a configuration of the output voltage variable power supply apparatus which uses the above-described regulator IC 10 and general purpose microcomputer is described with reference to FIG. 4A to FIG. 5B.

Figure 4A:
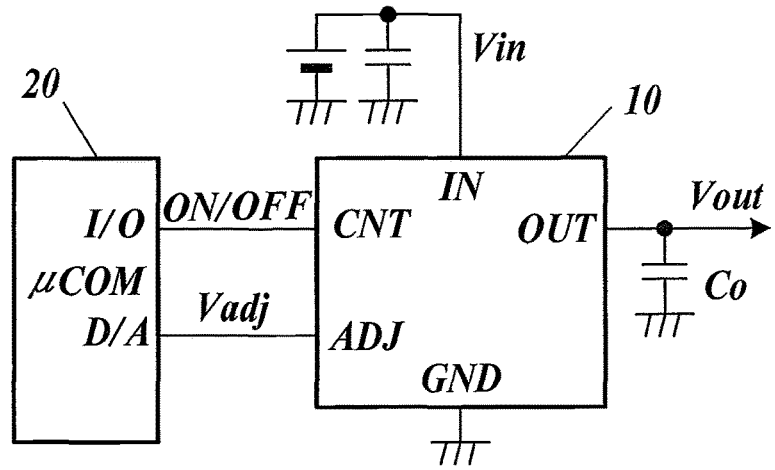
FIG. 4A and FIG. 4B are block diagrams showing an example of a configuration of a power supply system including a regulator according to the first embodiment and a microcomputer which controls such regulator.
Figure 4B:
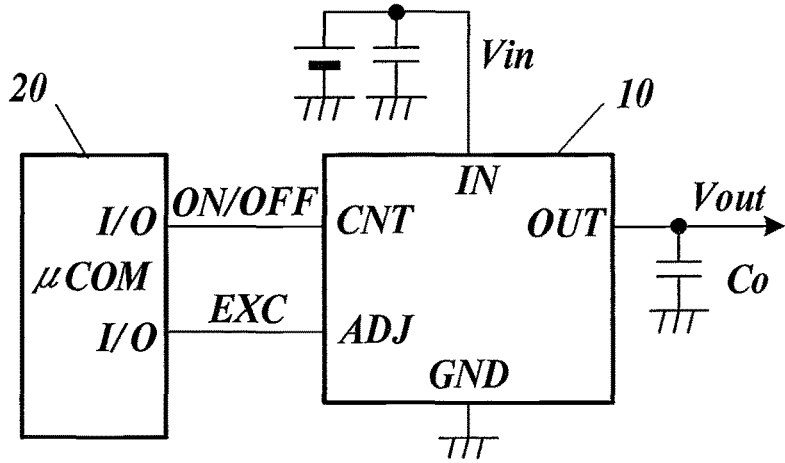

FIG. 4A is an example of a configuration of a power supply apparatus when a general purpose microcomputer including a D/A conversion circuit is used, and FIG. 4B is an example of a configuration of a power supply apparatus when a general purpose microcomputer not including a D/A conversion circuit is used.

Figure 5A:
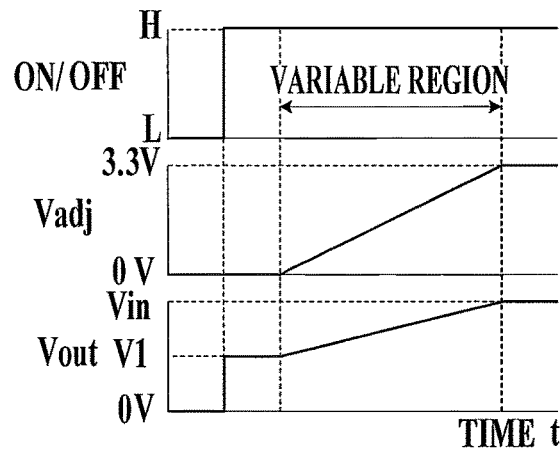
FIG. 5A is a waveform diagram showing a signal from the microcomputer and the change in the output voltage according to the power supply system shown in FIG. 4A.

When the general purpose microcomputer including a D/A conversion circuit is used, as shown in FIG. 4A, connection is made so that the signal D/A output from the output port of the D/A conversion circuit included in the microcomputer 20 is input to the external terminal ADJ of the regulator IC 10 as the control signal Vadj of the output voltage. Moreover, connection is made so that the ON/OFF signal of the regulator IC 10 is output from the normal I/O port of the microcomputer 20 to be input to the on/off control terminal CNT of the regulator 10. By configuring the power supply apparatus to include such connection, as shown in FIG. 5A, it is possible to achieve the output voltage variable power supply apparatus in which the output voltage Vout can be continuously changed according to the control signal Vadj input to the output control terminal ADJ.

Figure 5B:
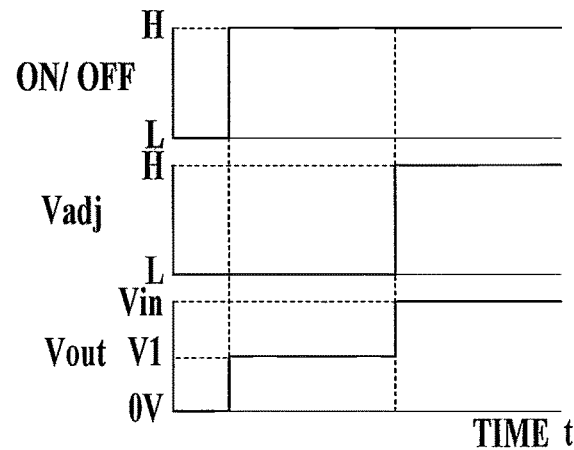
FIG. 5B is a waveform diagram showing a signal from the microcomputer and the change in the output voltage according to the power supply system shown in FIG. 4B.

When the general purpose computer not including a D/A conversion circuit is used, as shown in FIG. 4B, connection is made so that the switching signal EXC of the output voltage from the I/O port included in the microcomputer 20 is input to the output control terminal ADJ of the regulator IC 10. Moreover, connection is made so that the ON/OFF signal of the regulator IC 10 is output from the normal I/O port of the microcomputer 20 to be input to the on/off control terminal CNT of the regulator IC 10. By configuring the power supply apparatus to include such connection, as shown in FIG. 5B, it is possible to achieve the output voltage variable power supply apparatus which is able to change in stages the output voltage Vout according to the switching signal EXC input to the output control terminal ADJ.

According to the regulator IC 10 of the present embodiment, it is possible to achieve the output voltage variable power supply apparatus which does not use the external component of the IC and which is able to change the output voltage Vout by only the control signal Vadj or the EXC input to the output control terminal ADJ. The output voltage is determined by the accuracy of the reference voltage and the ratio of the internal resistor. With this, the accuracy and the temperature characteristics become good. In addition, the variable input voltage range becomes large and the variation accuracy of the input voltage becomes small. The feedback voltage is displaced and the output voltage is changed by the voltage-current conversion by the error amplifier, and therefore, a variable power supply apparatus in which the influence received by the power supply noise is small can be achieved.

When the D/A conversion function included in the microcomputer is used to generate the output control signal, the output voltage can be changed by only changing the software. In addition, the output voltage can be switched in two stages by the I/O function of the microcomputer.

According to the regulator IC 10 of the present embodiment, the on/off control terminal CNT to input the ON/OFF signal to stop the operation of the IC is provided. However, such on/off control terminal CNT can be omitted. When the on/off control terminal CNT is omitted, the regulator IC 10 can be made with four terminals. Therefore, the package can be made smaller, and this can reduce space and costs. The regulator IC 10 as described above uses the MOS transistor as the voltage control transistor M1 and the transistor M2 included in the output voltage changing circuit. Alternatively, the bipolar transistor can be used instead of the MOS transistor.

(Modification)

Next, the modification of the regulator IC 10 of the above-described embodiment is described with reference to FIG. 6.

Figure 6:
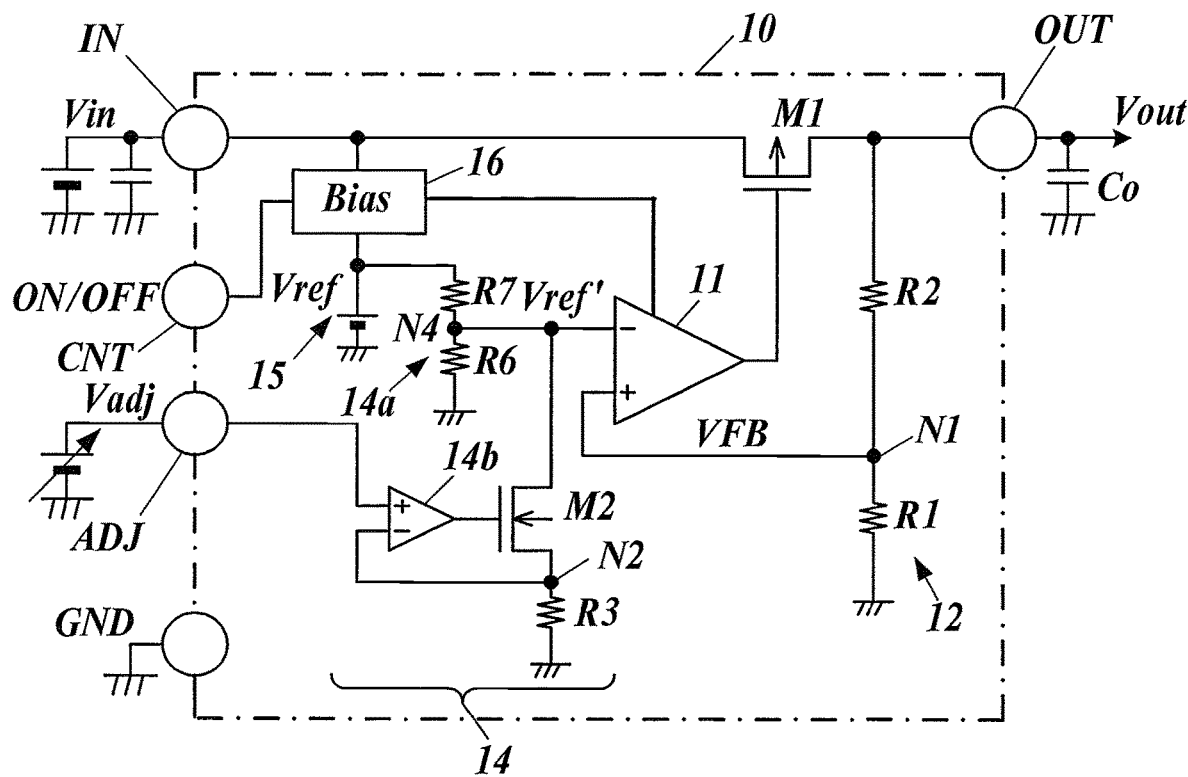
FIG. 6 is a circuit diagram showing a modification of an IC composing a regulator applying the first embodiment.

According to the modification shown in FIG. 6, the resistors R4 and R5 included in the voltage dividing circuit 14a connected to the output control terminal ADJ of the regulator IC 10 in the above-described embodiment is omitted. Instead, a voltage dividing circuit 17 is provided, and the voltage dividing circuit 17 includes resistors R6 and R7 which divide the voltage of the reference voltage Vref generated by the reference voltage source 15. The voltage Vref' divided by the resistors R6 and R7 is input to the error amplifier 11. Between the connection node N4 for the resistors R6 and R7 and the grounding point, the MOS transistors M2 and the resistor R3 included in the output voltage changing circuit 14 are connected in series, and the output control signal Vadj input in the output control terminal ADJ is directly input to the non-inverting input terminal of the error amplifier 14b.

In the regulator using the regulator IC of the modification shown in FIG. 6, the voltage Vref' of the node N4 is represented by the following formula (4).

$$Vref'=(1/R6+R7)*(R6*Vref-(R6*R7/R3)*Vadj) \qquad (4).$$

Therefore, the output voltage Vout is represented by the following formula.

$$\begin{aligned}Vout &= ((R1+R2)/R1)*Vef' \\ &= ((R1+R2)/R1*(R6+R7))* \\ &\quad (R6*Vref-(R6*R7/R3)*Vadj)\end{aligned} \qquad (5)$$

It is possible to understand from the above-described formula (5) that the output voltage Vout is determined by the relative accuracy of the internal resistor, and this can be set accurately. Moreover, by changing the control signal Vadj input to the output control terminal ADJ, the output voltage Vout can be changed.

Second Embodiment

Figure 7:
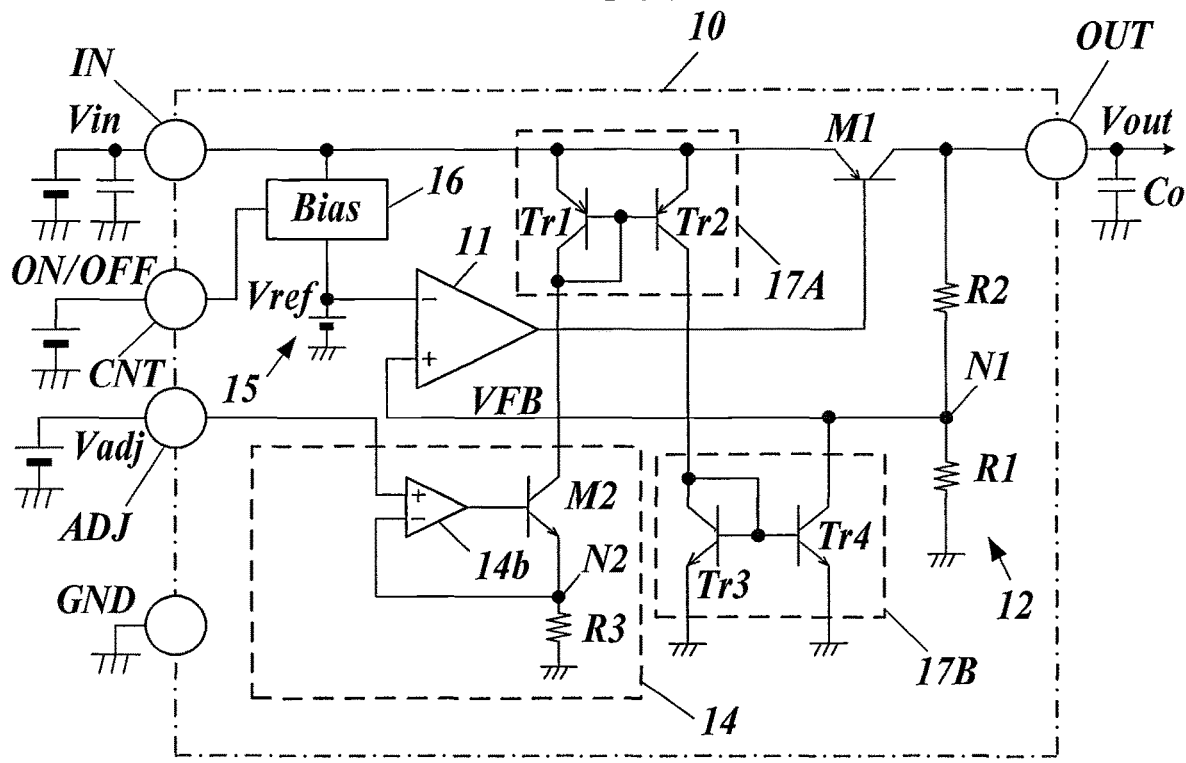
FIG. 7 is a diagram of a circuit configuration showing a second embodiment of a series regulator type output voltage variable power supply apparatus applying the present invention.

FIG. 7 shows a second embodiment of the regulator IC 10 including a series regulator as the output voltage variable power supply apparatus applying the present invention.

Instead of providing the voltage dividing circuit 14a of the output voltage changing circuit 14 in the first embodiment shown in FIG. 1, the output voltage variation power supply apparatus according to the present embodiment includes a first current mirror circuit 17a including transistors Tr1 and Tr2 connecting the base terminals of each other and a second current mirror circuit 17B including transistors Tr1 and Tr4 connecting the base terminals of each other as shown in FIG. 7.

The base terminal and the collector terminal of the transistors Tr1 and Tr3 are connected to function as the current-voltage conversion element. The converted voltage is applied to the transistors Tr2 and Tr4. With this, the electric current according to an emitter size ratio of the Tr1 and Tr2 and an emitter size ratio of the Tr3 and Tr4 flow in each of the transistors Tr2 and Tr4.

The transistor M2 as the voltage-current conversion element driven by the error amplifier 14b is not connected with the connection node of the resistors R2 and R1 included in the voltage dividing circuit 12 which generates the feedback voltage VFB. The transistor M2 is connected in series with the transistor Tr1 included in the first current mirror circuit 17A. The electric current of the transistor M2 is transferred with the current mirror circuits 17A and 17B, and the electric current is pulled out from the connection node N1 of the resistors R2 and R1.

Although not limited, the second embodiment describes the regulator IC 10 configured with a bipolar transistor. However, an MOS transistor (P-channel MOS and N-channel MOS) as in the first embodiment may be used. The other components of the configuration is the same as the regulator IC as described in the first embodiment.

In the regulator using the regulator IC of the second embodiment shown in FIG. 7, when the current ratio between the current mirror circuit 17A and 17B is set to be 1:1, the output voltage Vout is represented as follows.

$$V\text{out}=((R1+R2)/R1)*V\text{ref}+(V\text{adj}/R3)*R2 \quad (6)$$

Therefore, in the output voltage variation power supply apparatus according to the present embodiment, similar to the first embodiment, by applying any voltage (control signal Vadj) to the output control terminal ADJ, any output voltage can be set, and the output voltage Vout can be changed linearly according to the applied voltage on the output control terminal ADJ.

Figure 9A:
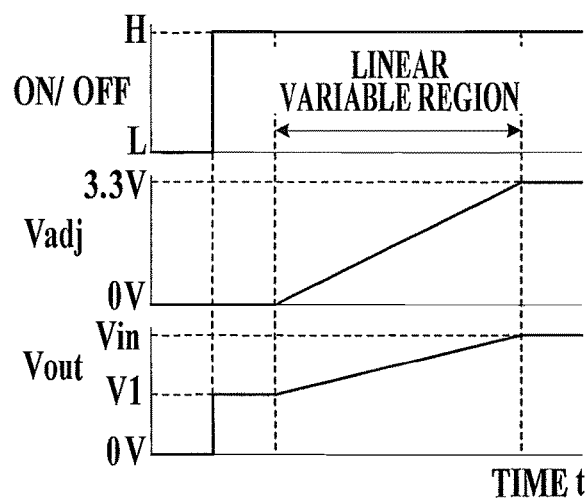
FIG. 9A is a waveform diagram showing a relation between an on/off control signal ON/OFF, and output control signal Vadj, and an output voltage Vout in an output voltage variable power supply apparatus shown in FIG. 7.

Specifically, FIG. 9A shows the relation between the input signal ON/OFF to the on/off control terminal CNT in the output voltage variation power supply apparatus according to the present embodiment, the control signal Vadj input to the output control terminal ADJ, and the output voltage Vout. It is possible to understand from FIG. 9A that when the control signal Vadj is changed within the range of 0 to 3.3 V, the output voltage Vout can be changed in the range of V1 to Vin. The variable range of the control signal Vadj being 0 to 3.3 V is one example, and the present embodiment is not limited to the above.

According to the output voltage variable power supply apparatus of the first embodiment shown in FIG. 1, a voltage dividing circuit 14a (resistors R5, R4) to divide the input voltage (Vadj) is provided in the output voltage changing circuit 14 to make the input range of the voltage (control signal Vadj) to the output control terminal ADJ larger, and the electric potential V3 of the connection node N3 of the voltage dividing circuit 14a needs to be set to equal to or less than Vref-Vds (M2) including variation. The voltage (Vadj) of the output control terminal ADJ is compressed with the voltage dividing circuit 14a and the output voltage Vout is changed to the desired voltage range. Since the electric potential V3 of the node N3 is multiplied by the gain of the output voltage changing circuit 14, the variation in the resisting ratio of the resistors R5 and R4 of the voltage dividing circuit 14a greatly influences the output voltage Vout.

According to the second embodiment, the voltage (Vadj) of the output control terminal ADJ is not compressed in the voltage dividing circuit 14a. Therefore, the control accuracy of the output voltage Vout by the control signal Vadj is enhanced compared to the output voltage variable power supply apparatus according to the first embodiment. According to the second embodiment, the variable range of the output voltage Vout can be changed with not only the resisting value of the resistor R3 of the output voltage changing circuit 14 but also the electric current ratio of the current mirror circuit 17A and 17B. With this, there is the advantage that the freedom of design is enhanced.

Further, according to the second embodiment, the variable control logic of the output voltage Vout by the control signal Vadj can be switched by the existence of the current mirror circuit 17B.

Specifically, the transistors Tr1 and Tr2 included in the current mirror circuit 17A and the transistors Tr3 and Tr4 included in the current mirror circuit 17B can be made on the chip of the regulator IC in advance. With a mask option, the connection lines between the transistors Tr2 and Tr3 are switched to the connection lines between the transistor Tr2 and the node 3 or the forming position of the through hole with relation to the lines from the node N3 to the input terminal of the error amplifier 11 is switched. With this, it is possible to obtain a circuit provided with only the current mirror circuit 17A or a circuit provided with both current mirror circuits 17A and 17B.

Figure 8:
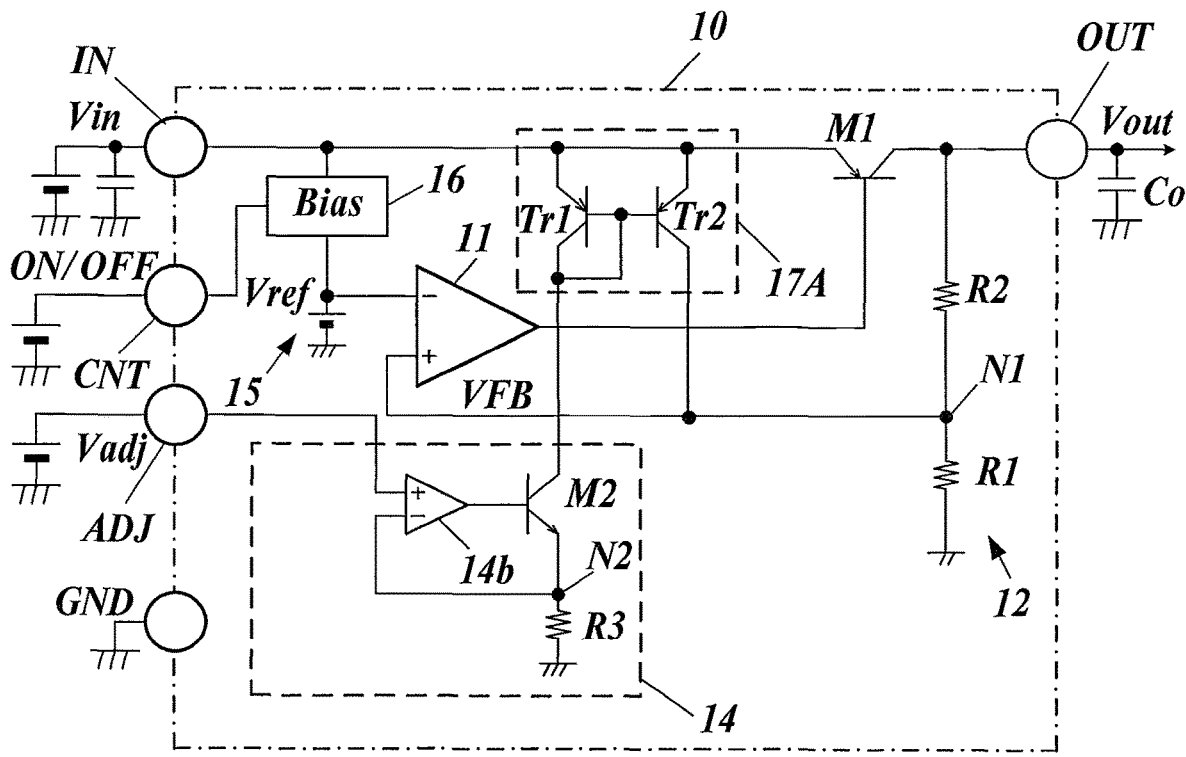
FIG. 8 is a circuit diagram showing a circuit configuration when a second current mirror circuit is omitted in a regulator IC according to the second embodiment shown in FIG. 7.

FIG. 8 shows a circuit diagram of the regulator IC 10 included in the series regulator in the second embodiment. In the regulator IC 10, the second current mirror circuit 17B is omitted in the regulator IC 10 of the second embodiment shown in FIG. 7 with a similar method. The collector terminal of the transistor Tr2 included in the first current mirror circuit 17A is connected to the connection node N1 of the resistors R2 and R1 included in the voltage dividing circuit 12. The current of the transistor M2 transferred in the current mirror circuit 17A flows in the connection node N1 of the resistors R2 and R1.

In the regulator IC 10 shown in FIG. 8, when the electric current ratio of the current mirror circuit 17A is set to 1:1, the output voltage Vout is represented by the following formula.

$$V\text{out}=((R1+R2)/R1)*V\text{ref}-(R1*V\text{adj}/R3) \quad (7)$$

It is possible to understand from this formula that the logic is opposite of the first embodiment, that is, as the control signal Vadj becomes lower, the output voltage Vout becomes higher.

Figure 9B:
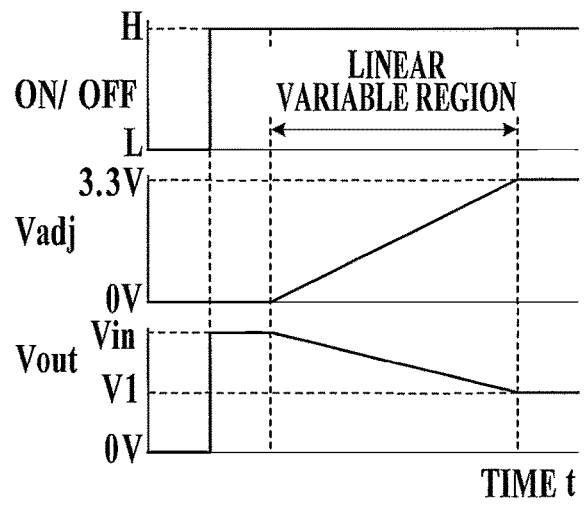
FIG. 9B is a waveform diagram showing a relation between an on/off control signal ON/OFF, and output control signal Vadj, and an output voltage Vout in an output voltage variable power supply apparatus shown in FIG. 8.

FIG. 9B shows the relation between the input signal ON/OFF to the on/off control terminal CNT in the output voltage variable apparatus of the modification, the control signal Vadj input to the output control terminal ADJ and the output voltage Vout. It is possible to understand from FIG. 9B that when the control signal Vadj changes within the range of 0 to 3.3 V for example, the output voltage Vout changes within the range of Vin to V1. The variable range of the control signal Vadj being 0 to 3.3 V is one example, and the present embodiment is not limited to the above.

When the user desires to configure the power supply apparatus to change the control logic of the output voltage Vout, that is, instead of the output voltage Vout becoming high when the control signal Vadj becomes high, the output voltage Vout becomes high when the control signal Vadj is low, it is necessary to provide a separate amplifier such as the inverting amplifying circuit in the stage before the error amplifier 14b in the output voltage variation power supply apparatus of the first embodiment. According to the modification, the control logic can be changed by omitting only the current mirror circuit 17B. The current mirror circuits 17A and 17B in FIG. 7 and FIG. 8 are not limited to those illustrated and may be a type in another circuit format such as a Wilson type or a base current compensation type.

The present invention is described in detail based on the embodiments of the present invention, but the present invention is not limited to the embodiments shown. For example, the first and second embodiments describe using a D/A conversion function included in the microcomputer to continuously change the output voltage Vout. However, other than the D/A output, a bleeder resisting circuit including a variable resistor can be used. The voltage dividing circuit (resistors R1, R2) 12 which generates the feedback voltage VFB of the output voltage and the resistor R3 may be connected as an external element of the regulator IC 10.

According to the present embodiment, the present invention is applied to the output voltage variable power supply apparatus in series regulator type, but the present invention can be applied to the power supply apparatus in a shunt regulator type.

According to one aspect of the present invention, there is a semiconductor apparatus for power supply control including: a voltage control transistor connected between a voltage input terminal in which DC voltage is input and an output terminal; a control circuit which controls the voltage control transistor according to an output feedback voltage; and a first external terminal in which an output control signal supplied from outside to control output voltage is input, wherein, the control circuit further includes: a first error amplifier which outputs a voltage according to an electric potential difference between a voltage divided by a first voltage dividing circuit which divides the output voltage of the output terminal and a predetermined reference voltage; and an output changing circuit which displaces the reference voltage input in the first error amplifier or the voltage divided by the first voltage dividing circuit according to a voltage input in the first external terminal to change the output voltage to a voltage according to the output control signal.

According to the semiconductor apparatus for power supply control and the output voltage variable power supply apparatus including the above configuration, the output voltage can be changed linearly with the output control signal from outside.

Moreover, the external element is not necessary. Since the output voltage is determined by the accuracy of the reference voltage and the ratio of the internal resistor, the accuracy and the temperature characteristics are preferable, the variable input voltage range becomes large, and the variation accuracy of the input voltage becomes small. Further, when the output control signal is generated using the D/A conversion function included in the microcomputer, the output voltage is variable by only changing the software.

Preferably, in the semiconductor apparatus for power supply control, the output voltage changing circuit includes, a second voltage dividing circuit which divides the voltage input in the first external terminal, a first transistor and a first resistor element connected in series between a node from which the voltage divided by the first voltage dividing circuit is taken out and a constant potential point, and a second error amplifier which outputs voltage according to an electric potential difference between the voltage divided by the second voltage dividing circuit and the voltage converted by current-voltage conversion by the first resistor element, wherein, the output of the second error amplifier is applied to a control terminal of the first transistor.

Preferably, in the semiconductor apparatus for power supply control, the output voltage changing circuit includes, a third voltage dividing circuit which divides the reference voltage, a second transistor and a second resistor element connected in series between a node from which voltage divided by the third voltage dividing circuit is taken out and a constant potential point, and a third error amplifier which outputs voltage according to an electric potential difference between a voltage input in the first external terminal and the voltage converted by current-voltage conversion by the second resistor element, wherein the output of the third error amplifier is applied to the control terminal of the second transistor.

According to the above-described configuration, the reference voltage or the feedback voltage is displaced with the voltage-electric current conversion by the error amplifier, and the output voltage is changed. Therefore the variable power supply apparatus in which the influence of the power supply noise is small can be obtained.

Preferably, in the semiconductor apparatus for power supply control, the output voltage changing circuit includes, a fourth error amplifier in which voltage input in the first external terminal is input, a third transistor in which output of the second error amplifier is applied to the control terminal, a current mirror circuit which is connected to the voltage input terminal and which transfers an electric current flowing in the third transistor, and a third resistor element connected in series with the third transistor, wherein, the fourth error amplifier outputs voltage according to an electric potential difference between the voltage input in the first external terminal and the voltage converted by current-voltage conversion by the third resistor element to the control terminal of the third transistor, flows an electric current according to the electric potential difference in the third transistor, and pulls out from or flows in the node from which the voltage divided by the first voltage dividing circuit is taken out the electric current transferred in the current mirror circuit.

According to the above configuration, the output voltage is changed linearly by the output control signal input in the first external terminal.

The output control signal input in the first external terminal is not compressed by the pressure dividing circuit, and the control accuracy of the output voltage by the control signal is enhanced. In addition, the variable range of the output voltage can be changed by not only the resisting value of the resistor element included in the output voltage changing circuit but also by changing the electric current ratio of the current mirror circuit. Therefore, the freedom of design is enhanced.

Further, the variable control logic of the output voltage by the output control signal input in the first external terminal can be switched by changing the configuration of the current mirror circuit.

Preferably, the semiconductor apparatus for power supply control further includes, a reference voltage source which generates the reference voltage; a bias circuit which generates an operation electric current supplied to the reference voltage source and the first error amplifier; and a second external terminal in which a control signal supplied from outside is input to stop an operation of the power supply apparatus, wherein the bias circuit stops the supply of the operation electric current to the reference voltage source and the first error amplifier according to the control signal input in the second external terminal.

According to the above configuration, the operation of the semiconductor apparatus for power supply control can be stopped with the control signal from outside, and the power supply apparatus can be stopped by the I/O function of the microcomputer.

According to another aspect of the present invention, an output voltage variable power supply apparatus includes: the semiconductor apparatus for power supply control; and a control apparatus which outputs a signal input to the first external terminal or the first external terminal and the second external terminal, wherein, the output voltage changes according to the signal input from the control apparatus to the first external terminal.

According to the output voltage variable power supply apparatus including the above configuration, the output voltage can be linearly changed by the input of the control signal to the first external terminal from the outside, and when the second external terminal is provided, the operation of the semiconductor apparatus for power supply control can be stopped with the control signal from outside, and the power supply apparatus can be stopped with the I/O function of the microcomputer.

According to the semiconductor apparatus for the power supply control and the output voltage variable power supply apparatus according to the present invention, the output voltage can be changed linearly without increasing the number of elements and the number of components. According to the present invention, a general purpose microcomputer can be used to easily control the output voltage in the The embodiments described above of the present invention should be construed for mere illustrative purposes, not for limitation. The present invention is not limitedly applied to the above-described embodiments, and appropriate modifications or alterations of the invention can be made within the scope without departing from the spirit of the invention.

What is claimed is:

1. A semiconductor apparatus for power supply control comprising:
    a voltage control transistor connected between a voltage input terminal in which DC voltage is input and an output terminal;
    a control circuit which controls the voltage control transistor according to an output feedback voltage; and
    a first external terminal in which an output control signal supplied from outside to control output voltage is input,
    wherein, the control circuit further includes:
        a first error amplifier which outputs a voltage according to an electric potential difference between a voltage divided by a first voltage dividing circuit which divides the output voltage of the output terminal and a predetermined reference voltage; and
        an output changing circuit which includes a second error amplifier in which voltage input in the first external terminal is input, a transistor in which output of the second error amplifier is applied to the control terminal, a current mirror circuit which is connected to the voltage input terminal and which transfers an electric current flowing in the transistor, and a transferring transistor which flows the electric current transferred in the current mirror circuit, wherein the current mirror circuit is connected to a node from which the voltage divided by the first voltage dividing circuit is taken out, wherein the output changing circuit displaces the voltage divided by the first voltage dividing circuit input in the first error amplifier according to a voltage input in the first external terminal to change the output voltage to a voltage according to the output control signal.

2. The semiconductor apparatus for power supply control according to claim 1, wherein the output voltage changing circuit includes,
    a resistor element connected in series with a transistor,
    wherein, the second error amplifier outputs voltage according to an electric potential difference between the voltage input in the first external terminal and the voltage converted by current-voltage conversion by the resistor element to the control terminal of the transistor, flows an electric current according to the electric potential difference in the transistor, and pulls out from the node from which the voltage divided by the first voltage dividing circuit is taken out the electric current transferred in the current mirror circuit.

3. The semiconductor apparatus for power supply control according to claim 1, further comprising,
    a reference voltage source which generates the reference voltage;
    a bias circuit which generates an operation electric current supplied to the reference voltage source and the first error amplifier; and
    a second external terminal in which a control signal supplied from outside is input to stop an operation of the power supply apparatus,
    wherein the bias circuit stops the supply of the operation electric current to the reference voltage source and the first error amplifier according to the control signal input in the second external terminal.

4. An output voltage variable power supply apparatus comprising:
    the semiconductor apparatus for power supply control according to claim 1; and
    a control apparatus which outputs a signal input to the first external terminal or the first external terminal and the second external terminal,
    wherein, the output voltage changes according to the signal input from the control apparatus to the first external terminal.

5. The output voltage variable power supply apparatus according to claim 4, wherein a load connected to the output terminal of the semiconductor apparatus for power supply control is a DC motor.

6. A semiconductor apparatus for power supply control comprising:
    a voltage control transistor connected between a voltage input terminal in which DC voltage is input and an output terminal;
    a control circuit which controls the voltage control transistor according to an output feedback voltage; and
    a first external terminal in which an output control signal supplied from outside to control output voltage is input,
    wherein, the control circuit further includes:
        a first error amplifier which outputs a voltage according to an electric potential difference between a voltage divided by a first voltage dividing circuit which divides the output voltage of the output terminal and a predetermined reference voltage; and
        an output changing circuit which includes a second error amplifier in which voltage input in the first external terminal is input, a transistor in which output of the second error amplifier is applied to the control terminal, a current mirror circuit which is connected to the voltage input terminal and which transfers an electric current flowing in the transistor, and a transferring transistor which flows the electric current transferred in the current mirror circuit, wherein the current mirror circuit is connected to a node from which the voltage divided by the first voltage dividing circuit is taken out, wherein the output changing circuit pulls out the electric current flowing in the transferring transistor from a node in which the voltage divided by the first voltage dividing circuit is taken out and displaces the voltage divided by the first voltage dividing circuit input in the first error amplifier to change the output voltage.

7. The semiconductor apparatus for power supply control according to claim 6, further comprising,
    a reference voltage source which generates the reference voltage;
    a bias circuit which generates an operation electric current supplied to the reference voltage source and the first error amplifier; and
    a second external terminal in which a control signal supplied from outside is input to stop an operation of the power supply apparatus,
    wherein the bias circuit stops the supply of the operation electric current to the reference voltage source and the first error amplifier according to the control signal input in the second external terminal.

8. An output voltage variable power supply apparatus comprising:
    the semiconductor apparatus for power supply control according to claim 6; and a control apparatus which outputs a signal input to the first external terminal or the first external terminal and the second external terminal, wherein, the output voltage changes according to the signal input from the control apparatus to the first external terminal.

9. The output voltage variable power supply apparatus according to claim 8, wherein a load connected to the output terminal of the semiconductor apparatus for power supply control is a DC motor.

10. A semiconductor apparatus for power supply control comprising:

a voltage control transistor connected between a voltage input terminal in which DC voltage is input and an output terminal;

a control circuit which controls the voltage control transistor according to an output feedback voltage; and a first external terminal in which an output control signal supplied from outside to control output voltage is input, wherein, the control circuit further includes:

a first error amplifier which outputs a voltage according to an electric potential difference between a voltage divided by a first voltage dividing circuit which divides the output voltage of the output terminal and a predetermined reference voltage; and an output changing circuit which includes a second error amplifier in which voltage input in the first external terminal is input, a transistor in which output of the second error amplifier is applied to the control terminal, a current mirror circuit which is connected to the voltage input terminal and which transfers an electric current flowing in the transistor, and a transferring transistor which flow the electric current transferred in the current mirror circuit, wherein the current mirror circuit is connected to a node from which the voltage divided by the first voltage dividing circuit is taken out, wherein the output changing circuit performs linear variation on the output voltage with a positive coefficient according to a voltage input in the first external terminal.

11. The semiconductor apparatus for power supply control according to claim 10, further comprising, a reference voltage source which generates the reference voltage;

a bias circuit which generates an operation electric current supplied to the reference voltage source and the first error amplifier; and a second external terminal in which a control signal supplied from outside is input to stop an operation of the power supply apparatus, wherein the bias circuit stops the supply of the operation electric current to the reference voltage source and the first error amplifier according to the control signal input in the second external terminal.

12. An output voltage variable power supply apparatus comprising:

the semiconductor apparatus for power supply control according to claim 10; and a control apparatus which outputs a signal input to the first external terminal or the first external terminal and the second external terminal, wherein, the output voltage changes according to the signal input from the control apparatus to the first external terminal.

13. The output voltage variable power supply apparatus according to claim 12, wherein a load connected to the output terminal of the semiconductor apparatus for power supply control is a DC motor.

* * * * *